May 14, 1968  J. E. REHDER  3,383,099
METHOD AND APPARATUS FOR RAPID HEATING OF SOLID MATERIALS
Filed Oct. 24, 1965  2 Sheets-Sheet 1
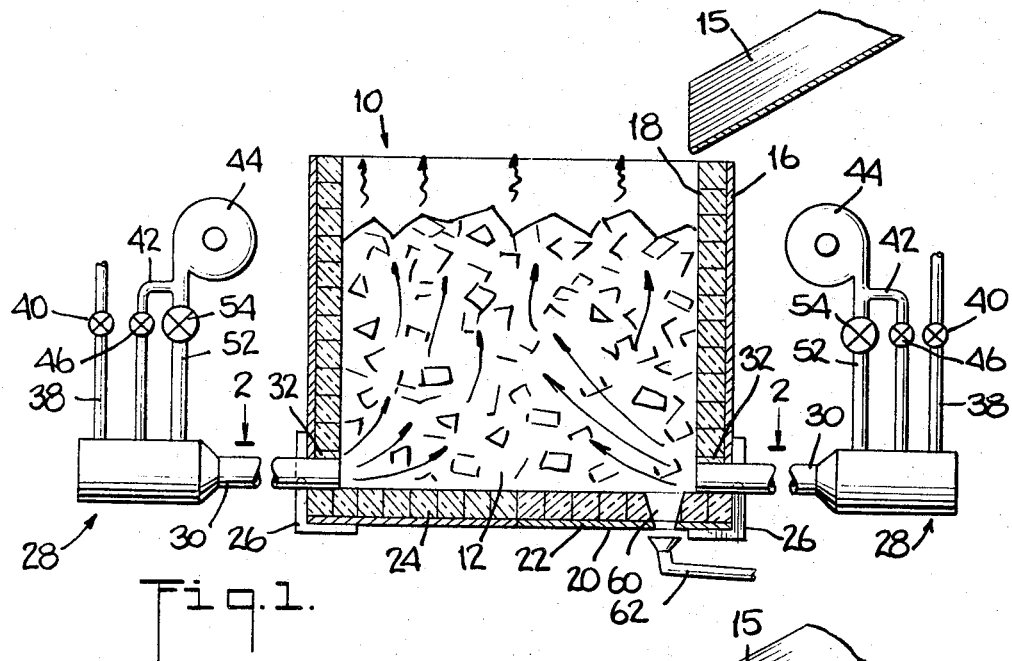
Fig.1.
Fig.3.
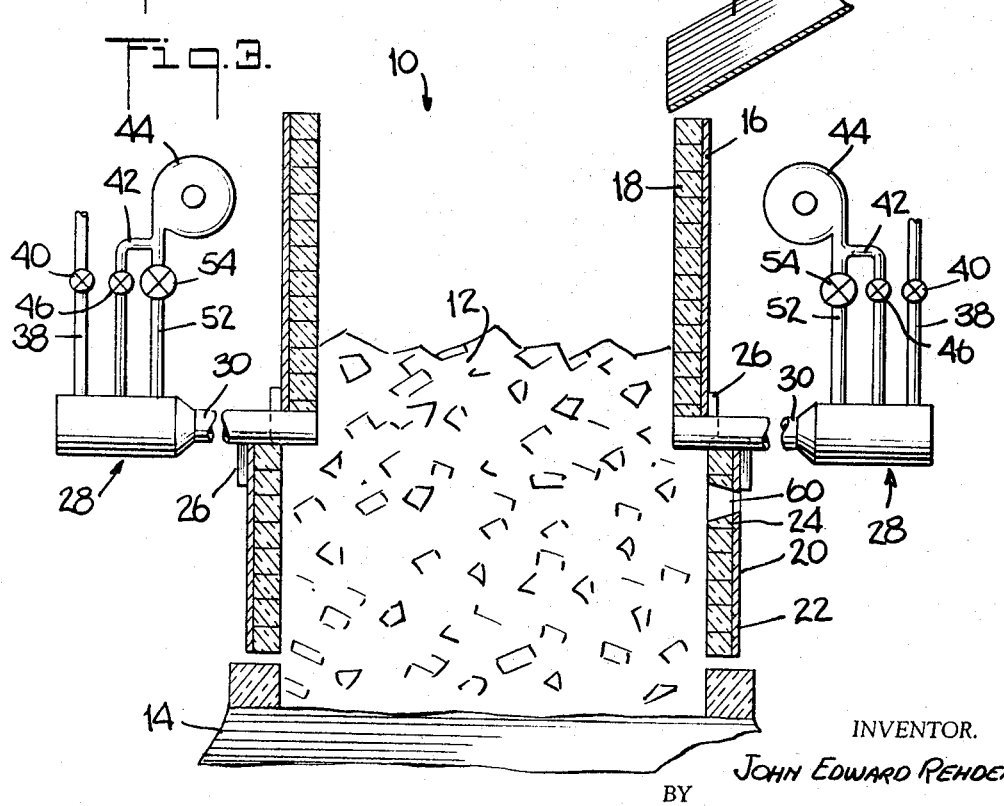
INVENTOR.
JOHN EDWARD REHDER
BY
ATTORNEYS

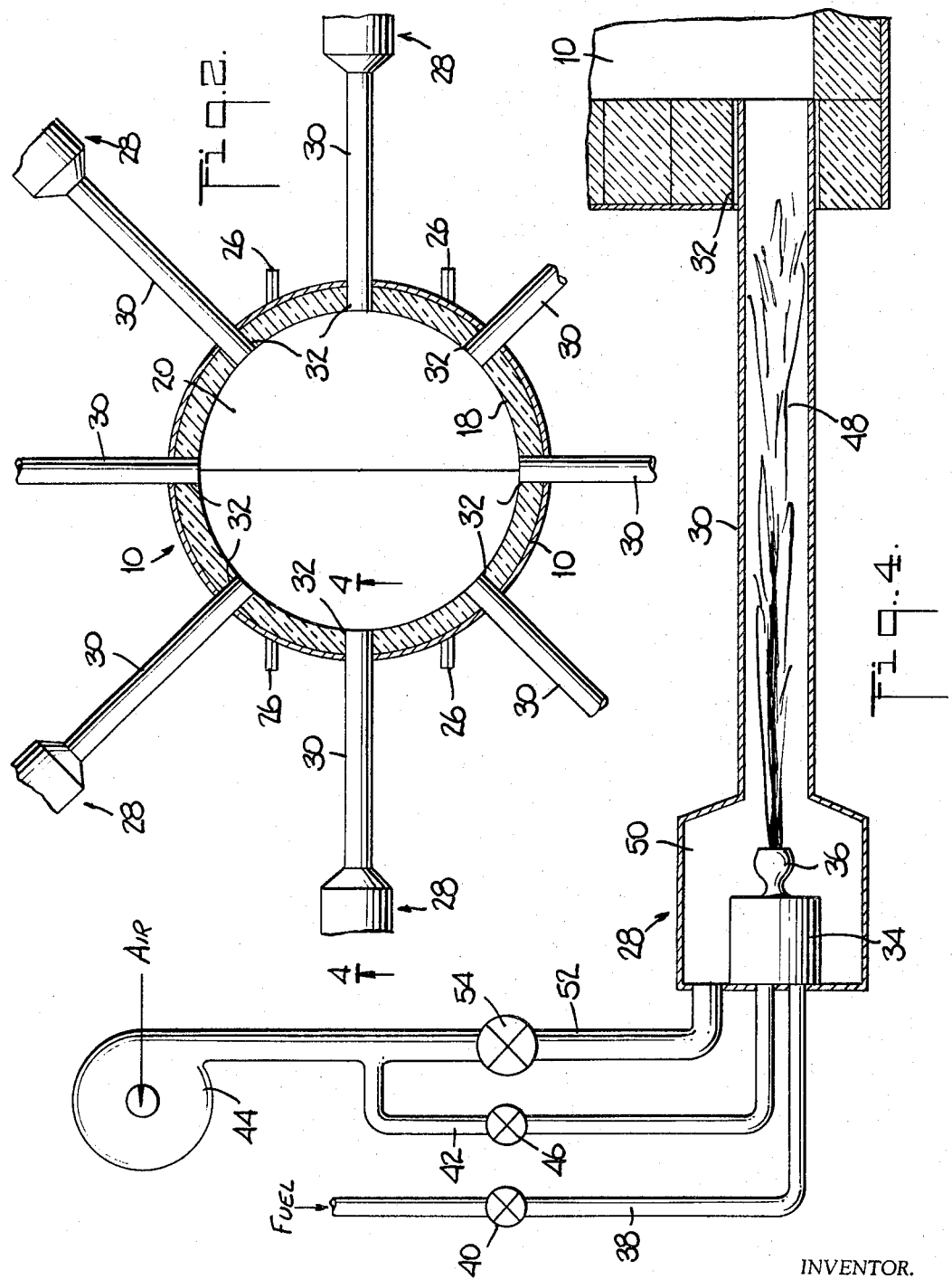

United States Patent Office 3,383,099
Patented May 14, 1968

3,383,099
METHOD AND APPARATUS FOR RAPID HEATING OF SOLID MATERIALS
John Edward Rehder, Pointe Claire, Quebec, Canada, assignor to Brown Boveri Corporation, New York, N.Y., a corporation of New York
Filed Oct. 24, 1965, Ser. No. 504,734
15 Claims. (Cl. 263—29)

ABSTRACT OF THE DISCLOSURE

Preheating of solid aggregate material wherein the material is held packed in a container and burners supply hot gases which are mixed with air to achieve temperatures below the melting point of the material and velocities sufficient to achieve significant reduction of the film resistance to convective heat transfer which surrounds the aggregate particles.

---

This invention relates to heat transfer operations, and more particularly it concerns a novel method and apparatus for rapidly changing the temperature of solid material in aggregate form.

The present invention is particularly useful in conjunction with the refining and/or alloying of metals in their molten state. In carrying out these refining and alloying processes, electrical furnaces either of the arc, induction, or resistance type, are widely used because of their high thermal efficiency and because of their ability to maintain close control of both temperature and chemistry. However, the advantages of an electric furnace are of no particular value in the heating range between room temperature and the melting point of the ingredient metals. Further, because of the high cost of electrical energy as compared to the cost of chemical fuels, a substantial savings can be realized by preheating the ingredient metals prior to charging them into an electric furnace.

A considerable amount of effort has been devoted to the development of an efficient preheating furnace. By and large, such preheating furnaces have been of the kiln type which comprise a large elongated oven type chamber through which the charge material was transferred while hot gases passed over the material. While a small increase in overall efficiency has been achieved in this manner, it has not been enough to justify the capital costs of the very large kiln type furnaces required. Also, in order to make full and efficient use of the available heat from the burners of these preheating furnaces, a considerable length of time, (i.e., measured in terms of hours) was required to bring the charge material up to its desired preheated temperature. Then, when the charge material was held for such long periods at temperatures above 1300–1500° F., it tended to oxidize and form a scale about its surface. This severely limited the temperature at which the preheated furnace could operate; and as a result, the efficiency increase obtained by the preheated operation, was nowhere near its full potential.

It has also been proposed to use cupolas to melt ingredient metals for electric furnaces. Cupolas essentially are vertical columns packed with alternate layers of metal to be melted and coke. Air is blown in through tuyeres near the bottom of the device and cause the adjacent layer of coke to burn and melt the metal immediately above it. This technique suffers from the disadvantage that the molten metal produced by the cupola will stick together and to the cupola itself with consequent clogging of the system unless the metal is given a substantial superheat in the cupola. Such a superheat however greatly reduces the efficiency of the cupola.

The present invention makes it possible to utilize the full potential of a separate preheating operation in order to reduce the overall costs of metallurgical refining and alloying processes.

According to the present invention, solid aggregate material is heated very rapidly to a temperature just under its melting temperature. The material thus heated, but still in its solid condition, is thereafter easily transferred to an electrical furnace where it is melted in an efficient manner. By rapidly heating the solid aggregate material, a smaller preheating unit will produce as much preheated material as a larger slower operating unit. Thus capital costs are greatly reduced through the present invention. Further, the rapid heating together with a correspondingly rapid charging of the melting furnace serves to reduce the time during which the preheated metal is above its oxidizing temperature. Accordingly, scaling of the material is minimized.

The rapid preheating of the present invention is achieved by providing hot gases at a temperature which will not melt the materials being preheated; and then forcing these gases at high velocity through a packed column of the material. The velocity of the hot gases is made to be sufficiently high to produce conditions of high turbulence among the interstices of the packed material with a corresponding reduction of the film resistance to convective heat transfer which surrounds the aggregate particles. This reduction of film resistance increases the capacity of the aggregate material to absorb heat; and this in turn accommodates the greater heat flow accompanying the high gas velocities reducing the film resistance. As a result, more heat is transferred into the material in a shorter length of time.

Although it is well known that heating rates are directly proportional to the temperature of the heat source, the present invention achieves more rapid heating by actually restricting the temperature of the hot gas heat source to a level below that which would cause any melting of the aggregate material. The invention is based in part upon the discovery that the wetting due to melting, even of a small portion of the aggregate material, seriously impairs its heat absorption characteristics; and that maximum heat transfer efficiency occurs only while the material is entirely in its dry solid state. This discovery is used to practical advantage in obtaining very high heat transfer rates by using excess air to cool the hot gases. This has the effect of increasing gas velocity, which in turn sharply increases the convective heat transfer coefficient of the material being heated, so that heat is much more readily absorbed by the material.

In one of its aspects, the present invention comprehends a heating chamber having a portion of its length filled with aggegate material to be heated, and burner means arranged such that the entire hot gas output therefrom is directed to blow through the heating chamber at very high velocity. As the heat input rate is increased by increasing the flow rate of the hot gasses, their increased velocity generates greater turbulence among the aggregate particles, and this in turn increases the heat absorption rate of the aggregate material.

In another of its aspects, the present invention makes possible a preliminary purification of the dry aggregate charge material while effecting a preheating thereof. This preliminary purification is achieved by causing lower melting point materials associated with the basic charge material to liquify and drain off prior to transfer of the charge material into a melting furnace. This preliminary purification is achieved at low cost and it permits the melting and refining furnace to operate with a far higher degree of precision than it would operate when charged with a high percentage of impurities.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings forming a part of the specification, wherein:

FIG. 1 is a section view taken in side elevation and showing apparatus embodying the present invention;

FIG. 2 is a section view taken along lines 2—2 of FIG. 1;

FIG. 3 is a view similar to FIG. 1, showing the apparatus discharging into a melting furnace; and FIG. 4 is a view taken along lines 4—4 of FIG. 2, and illustrating a typical burner construction for the apparatus of FIG. 1.

As shown in FIGS. 1–3, there is provided a heating chamber 10 in which solid aggregate material 12 is rapidly preheated and thereafter discharged in its solid condition (FIG. 3) into a melting furance 14. The top of the chamber 10 is open and the aggregate material 12 is supplied via this open top from a feed chute 15.

The heating chamber 10 itself comprises a cylindrical column formed of a tubular steel jacket 16 with a refractory lining 18 of brick or similar material; and a bottom closure formed of a pair of semicircular doors 20 (FIG. 2). Each door, is formed of a steel outer cover 22 and an inner refractory lining 24. Hinges 26 are provided, along with a door opening and closing mechanism (not shown) to permit the doors 20 to move between a closed position as shown in FIG. 1 and an opened position as shown in FIG. 3.

A plurality of burners 28 are provided around the circumference of the heating chamber 10 near the doors 20. These burners include flame tubes 30 which enter into the chamber 10 through tuyere like openings 32.

As shown in FIG. 4, each burner 28 comprises a mixing chamber 34 having a flame nozzle 36 located at one end of the flame tume 30. Fuel, such as oil or gas, is supplied to the mixing chamber 34 via a fuel supply line 38 from a source (not shown). A fuel control valve 40 is interposed in the line 38 for adjusting the rate of consumption, and therefore the heat input rate of the device. Air is also supplied to the mixing chamber via an air supply line 42 from a blower 44. An air control valve 46 is provided in the line 42 to permit proper adjustment of the air supply to coincide with the fuel flow rate so that proper and complete combustion may be maintained. The air and fuel supplied via the lines 38 and 42 are mixed in the chamber 34 and directed out through the flame nozzle 36 where the fuel reaches its ignition temperature. As a result of the ignition of the fuel-air mixture, a flame 48 is formed and is projected along the flame tube 30.

There is additionally provided an air injection chamber 50 which is arranged to supply additional air into the flame tube 30 near the heel of the flame 48. An injection air line 52 having an injection control valve 54, communicates between the blower 44 and the air injection chamber 50. The injected air is heated by the flame 30; and because of its high rate of flow, it serves to reduce the temperature at the far end of the flame tube 30 to a value below that which will cause melting of the aggregate material 12 in the heating chamber 10. Also, as will be described more fully hereinafter, the injected air serves to increase the hot gas velocity through the aggregate material 12 and thus increases its heat absorption capacity for more rapid heating.

Reverting to FIG. 1 there is shown a funnel shaped drain hole 60 formed in the bottom of the heating chamber 10. A trough member 62 is positioned under the drain hole 60 to catch and drain off all liquid material which drains out from the heating chamber. The purpose of this will be described more fully hereinafter.

Operation of the above-described system is as follows: The heating chamber 10, with its doors 20 closed as in FIG. 1, is charged with solid aggregate material 12, such as iron or steel scrap, via the feed chute 15. The burners 28 are then turned on and injection air is blown in through the air injection chamber 50 to the flame tube 30 where it mixes with and becomes heated by the products of combustion making up the flame 48. The thus heated gases then proceed out the flame tube and through the tuyere like openings 32 into the heating chamber 10.

The hot gases are forced into the heating chamber 10 at a high volumetric rate and accordingly they move at very high velocity inside the chamber. Also, in passing through the chamber, the hot gases become divided among a myriad of tortuous flow paths defined by the random arrangement of the aggregate particles packed within the chamber. This produces a turbulent flow characteristic and causes the hot flowing gases to penetrate and reduce the thickness of the static gas film which envelops each particle. As a result, the convective heat transfer characteristic of the aggregate material is sharply improved. The material thus becomes heated at a faster rate even though the temperature of the hot gases is reduced; the positive effect of increased gas velocity on the convective heat transfer characteristic exceeding the negative effect of reducing the hot gas temperature.

In a test model a heating chamber having a 24 inch inside diameter was charged with 800 pounds of miscellaneous scrap iron. Heat was supplied as above described at a rate of 6000 B.t.u. per square inch of cross sectional chamber area per hour. As a result, the charge was heated to an average temperature of 1500° F. in five minutes and a thermal efficiency of over 55 percent. Scaling or oxide formation was negligible. It is expected that a heating chamber having a diameter of 36 inches will heat a 2000 pound charge of material to an average temperature of 1900° F. in 11 minutes at a heat input rate of 8000 B.t.u. per square inch of heating chamber cross section per hour and at a thermal efficiency of 40 percent.

The amount of pressure needed to obtain the necessary hot gas velocities depends upon the particle size of the aggregate material. It has been found however, that for aggregate material composed of iron or steel scrap or miscellaneous castings, a positive pressure of one to three ounces per square inch per foot of filled heating chamber height is preferable. Of course, the burners 28 require a substantially greater pressure for effecting proper combustion, so that the blowers 44 must be sufficiently large to supply air at the burner pressure. The injection control valve 54 serving to reduce this to the required lower value for use in the air injection chambers 50.

As stated previously, the hot gas temperature is maintained below that which would cause melting of the material being heated. As a result of this, the material will not stick together nor will it stick to the sides of the heating chamber. Accordingly, the material may easily be transferred out of the heating chamber 10 and into the melting furnace 14.

In order to achieve an appreciable increase in the heating rate of the aggregate material 12, the rate of heat input to the material should be at least 2000 B.t.u.

per square inch of heating chamber cross section, per hour maintaining, of course, a maximum temperature below that which will cause melting of the aggregate material. This rate of heat application can be increased to 20,000 or more B.t.u. per square inch of heating chamber cross section per hour.

The height of the material in the heating chamber should be at least two feet for reasonable thermal efficiency with three to six feet giving very good efficiency. The cross-sectional area of the heating chamber 10 is determined by the weight of material to be heated per hour, the temperature to be attained, the thermal efficiency, and the rate of heat input.

The above described heating arrangement is especially suited for preheating miscellaneous scrap iron for use in an electrically operated melting and alloying or refining furnace. Very often scrap iron is associated with various foreign metals of lower melting point, such as lead or aluminum. When a charge of miscellaneous scrap material, the basic constituent of which is iron, is heated in the chamber 10 as above described, the lower melting point impurities, such as aluminum and lead, which are also present in the scrap charge, will melt and flow out the drain hole 60 and through the trough member 62 to be collected and/or disposed of at a remote point. The iron and other higher melting point materials which remain in the heating chamber are thus purified by liquation and they will provide a substantially improved charge for use in the melting furnace 14.

The removal of various non-ferrous materials by liquation as above described makes available for use in iron and steel production large amounts of scrap metal heretofore considered too impure for economical refining. It is well known that the percentage of non-ferrous contaminants in scrap iron and steel has increased steadily over the years; and will probably continue to do so as long as products continue to be made of diverse materials. The automotive industry, for example, has resulted in an especially large amount of scrap iron and steel intermixed with various non-ferrous contaminants. Previously, it had been considerably expensive and difficult to remove non-ferrous contaminants from scrap metals. Yet unless these contaminants were removed prior to melting of the ferrous material, they became absorbed into the ferrous material and often produced drastic deterioration of the mechanical characteristics of the final product. For example even a minute amount of lead will almost destroy the ductility of ductile iron. For this reason a considerable portion of available scrap metal has been unsatisfactory for use in iron and steel production. The liquation purification feature of the present invention however, has made it possible to utilize this "unsatisfactory" material in the production of iron and steel. It has therefore served also to reduce to an even lower level the percentage of contaminants in scrap metal which was considered suitable for iron and steel production. The rapid heating process of the present invention makes possible a smaller heating chamber in which the liquation process can be more readily carried out. The small heating chamber, besides being quite economical from a capital cost standpoint, also permits rapid and complete drainage of all impurities as they are melted off from the basic charge material.

Various modifications to the heating chamber 10 may be made within the spirit of the present invention. For example, the doors 20 can be replaced by movable grates arranged to allow continuous flow of aggregate material through the heating chamber. It is important however that the chamber be packed, that is, filled with aggregate material over its entire cross section, and that the output of the burners 28 be positively directed into the interior of the heating chamber. This is necessary to ensure that all the hot gas output passes through the bed of aggregate material in the heating chamber. These hot gases will take the path of least resistance so that any portion of the chamber's cross section which is not covered by aggregate material will constitute a resistance free path through which the greater portion of the hot gases will flow. These gases thus pass through the heating chamber without transferring their heat to the aggregate material so that the thermal efficiency of the operation drops drastically. Further, the hot gases which do pass through the bed of aggregate material are reduced to near zero velocity so that the improved heat transfer characteristics described above, are lost.

It will be appreciated that the preheating unit of the present invention is simple in structure and has a high heat output for its size. Further, it is low in capital cost per unit of output, such cost being from 10 to 20 percent of the capital cost of similar electric furnace capacity with equivalent energy input.

Having thus described my invention with particular reference to the preferred forms thereof, it will be obvious to those skilled in the art to which the invention pertains, after understanding my invention, that various other changes and modifications may be made therein without departing from the spirit and scope of my invention, as defined by the claims appended thereto.

What is claimed as new and desired to be secured by Letters Patent is:

1. A method for rapidly heating solid aggregate material, said method comprising the steps of, packing said material to fill a confined region, heating gaseous material to a temperature below that which will produce melting of the aggregate material and thereafter, while maintaining said material in packed configuration and free from fluidization in said confined region, forcing the heated gaseous material through said confined region at a velocity sufficient to produce turbulent gas flow among the interstices of the packed aggregate material and a substantial reduction of the static film thickness which surrounds each aggregate particle thus increasing the convective heat transfer coefficient of the material.

2. A method for rapidly preheating solid material in aggregate form for use in a melting furnace said method comprising the steps of packing said material into a heating chamber to fill an entire cross section of said chamber, completely burning fuel outside said chamber at a rate sufficient to produce at least 2000 B.t.u. per square inch of heating chamber cross-sectional area per hour, mixing sufficient additional air with the products of combustion of said fuel to produce a hot gas mixture having a substantially uniform temperature close to but less than that which will cause melting of said solid material, and forcing all of said hot gas mixture through said heating chamber cross section at the rate it is produced.

3. A method as in claim 2 wherein said solid aggregate material filling the cross section of said heating chamber is in the form of a bed having a thickness of from two to six feet.

4. A method as in claim 2 wherein said fuel is burned at a rate to produce approximately 8000 B.t.u. per square inch of heating chamber cross section per hour.

5. A method as in claim 2 wherein the amount of additional air is sufficient to produce a hot gas mixture at about 1900° F.

6. A method as in claim 2 wherein said hot gas mixture is forced through said heating chamber under a pressure of from about 1 to about 3 ounces per square inch for each foot of iron material in said heating chamber.

7. In an iron processing operation, the steps of packing solid iron material in aggregate form into a preheating chamber to fill an entire cross section of said chamber, completely burning fuel outside said chamber at a rate sufficient to produce at least 2000 B.t.u. per square inch of heating chamber cross-sectional area per hour, mixing sufficient additional air with the products of combustion of said fuel to produce a hot gas mixture having a substantially uniform temperature close to but less than that which will cause melting of said iron material, forcing all of said hot gas mixture through said heating chamber cross section at the rate it is produced until the temperature of said iron material is heated to a temperature just below its melting point and thereafter transferring the preheated solid iron material to a melting furnace.

8. Apparatus for rapidly heating solid aggregate material said apparatus comprising an upright column adapted to be packed to a desired height with solid aggregate material, so that said material is maintained in packed configuration and free from fluidization within said column, a plurality of burners located outside said column, means arranged to supply fuel and air to said burners for effecting combustion therein, air injection means arranged to supply additional quantities of air to be heated by the products of combustion of said burners to develop a hot gas mixture and means for directing all of the hot gas mixture formed by said burner means and said air injection means to flow upwardly through said column at a velocity sufficient to produce turbulent gas flow among the interstices of the packed aggregate material and a substantial reduction of the static film thickness which surrounds each aggregate particle thus increasing the convective heat transfer coefficient of the material.

9. Apparatus as in claim 8, wherein said burners are displaced from said column at a distance sufficient to allow completion of combustion outside said column.

10. Apparatus as in claim 8, wherein said column is provided with a hinged drop floor on the bottom thereof.

11. Apparatus as in claim 8, wherein said burners are of sufficient capacity to deliver a total heat output excess of 8000 B.t.u. per square inch of column cross section per hour.

12. Apparatus as in claim 8, wherein said fuel burners are of sufficient capacity to deliver a total heat output of about 20,000 B.t.u. per square of column cross-section per hour.

13. Apparatus as in claim 8 wherein said burners are of a sufficient capacity to deliver a total heat output of at least 2000 B.t.u. per square inch of column cross-section per hour.

14. A method for rapidly preheating solid iron material in aggregate form for use in a melting furnace said method comprising the steps of packing said material into a heating chamber to fill an entire cross section of said chamber, completely burning fuel outside said chamber at a rate sufficient to produce at least 2000 B.t.u. per square inch of heating chamber cross-sectional area per hour, mixing sufficient additional air with the products of combustion of said fuel to produce a hot gas mixture having a substantially uniform temperature less than that which will cause melting of said iron material and above that which will cause melting of lower melting point impurities associated with said iron material, forcing all of said hot gas mixture through said heating chamber cross section at the rate it is produced, and separating the melted impurities so produced from the unmelted iron aggregate.

15. In an iron processing operation, the steps of packing solid iron material in aggregate form and containing lower melting point impurities into a preheating chamber to fill an entire cross section of said chamber, completely burning fuel outside said chamber at a rate sufficient to produce greater than 2000 B.t.u. per square inch of heating chamber cross-sectional area per hour, mixing sufficient additional air with the products of combustion of said fuel to produce a hot gas mixture having a substantially uniform temperature less than that which will cause melting of said iron material and greater than that of said lower melting point impurities forcing all of said hot gas mixture through said heating chamber cross section at the rate it is produced until the temperature of said iron material is heated to a temperature just below its melting point draining the melted impurities from the unmelted iron material, and thereafter transferring the preheated solid iron material to a melting furnace.

References Cited

UNITED STATES PATENTS

| | | | |
|---|---|---|---|
| 1,682,343 | 8/1928 | Lanigan | 263—27 |
| 2,034,071 | 3/1936 | Wickland | 263—27 X |
| 2,343,780 | 3/1944 | Lewis | 263—29 X |
| 3,140,864 | 7/1964 | Lellep | 263—29 |
| 3,150,958 | 9/1964 | Collin et al. | 266—24 X |
| 3,163,520 | 12/1964 | Collin et al. | 266—24 X |
| 3,174,735 | 3/1965 | McFadden | 263—19 |

FREDERICK L. MATTESON, JR., *Primary Examiner.*

JOHN J. CAMBY, CHARLES J. MYHRE, *Examiners.*